(12) United States Patent
Villegas et al.

(10) Patent No.: US 12,346,438 B2
(45) Date of Patent: Jul. 1, 2025

(54) METHOD FOR SECURELY PROCESSING DIGITAL INFORMATION IN A SECURE ELEMENT

(71) Applicant: Nagravision Sarl, Cheseaux-sur-Lausanne (CH)

(72) Inventors: Karine Villegas, Cheseaux-sur-Lausanne (CH); Roan Hautier, Cheseaux-sur-Lausanne (CH)

(73) Assignee: Nagravision Sarl, Cheseaux-sur-Lausanne (CH)

( * ) Notice: Subject to any disclaimer, the term of this patent is extended or adjusted under 35 U.S.C. 154(b) by 209 days.

(21) Appl. No.: 17/907,378

(22) PCT Filed: Mar. 25, 2021

(86) PCT No.: PCT/EP2021/057819
§ 371 (c)(1),
(2) Date: Sep. 26, 2022

(87) PCT Pub. No.: WO2021/198035
PCT Pub. Date: Oct. 7, 2021

(65) Prior Publication Data
US 2023/0119890 A1    Apr. 20, 2023

(30) Foreign Application Priority Data
Mar. 31, 2020 (EP) .................... 20167097

(51) Int. Cl.
*G06F 21/55* (2013.01)
*G06F 21/64* (2013.01)
*G06F 21/79* (2013.01)

(52) U.S. Cl.
CPC ............ *G06F 21/556* (2013.01); *G06F 21/64* (2013.01); *G06F 21/79* (2013.01)

(58) Field of Classification Search
None
See application file for complete search history.

(56) References Cited

U.S. PATENT DOCUMENTS 10,348,767 B1 * 7/2019 Lee .................. H04L 67/10
2008/0263422 A1   10/2008 Bardouillet
(Continued)

FOREIGN PATENT DOCUMENTS

CN      109154963 A      1/2019
WO    WO-2018010794 A1 * 1/2018 .......... G06F 12/1458

OTHER PUBLICATIONS

International Search Report & Written Opinion issued Sep. 24, 2020 in PCT/EP2021/057819 filed on Mar. 25, 2021, 11 pages.
(Continued)

*Primary Examiner* — Trang T Doan
(74) *Attorney, Agent, or Firm* — Oblon, McClelland, Maier & Neustadt, L.L.P.

(57) ABSTRACT

A method if provided for securely processing digital information performed by a secure element having a secure processor. The method includes loading the digital information from an external memory into the secure element; segmenting the digital information into words of digital information (Wij,k), generating error-detection codes or error-correction codes from said words of digital information and associating said error-detection codes with the corresponding words; transferring the words of digital information and the associated error-detection codes or error-correction codes to the secure processor; and in the secure processor, verifying the words of digital information based on the associated error-detection codes or error-correction codes before processing the digital information contained in said words.

20 Claims, 5 Drawing Sheets

(56) References Cited

U.S. PATENT DOCUMENTS

| | | |
|---|---|---|
| 2016/0085692 A1 | 3/2016 | Kwok |
| 2017/0078330 A1* | 3/2017 | Sreeramoju ......... H04L 61/5014 |
| 2019/0080096 A1* | 3/2019 | Savry ..................... G06F 21/44 |
| 2020/0213092 A1* | 7/2020 | Shim .................... H04L 9/0866 |

OTHER PUBLICATIONS

Elbaz et al., "A Parallelized Way to Provide Data Encryption and Integrity Checking on a Processor-Memory Bus", 2005 $43^{rd}$ ACM/IEE Design Automation Conference, Jul. 24, 2006 pp. 506-509, XP058354056.

European Search Report issued Sep. 14, 2020 in EP 20167097 filed on Mar. 31, 2020, 7 pages.

\* cited by examiner

METHOD FOR SECURELY PROCESSING DIGITAL INFORMATION IN A SECURE ELEMENT

TECHNICAL FIELD

The present disclosure relates to the field of computer security and more precisely to securely processing digital information, such as code and/or data, with a secure element, for example a smart card.

BACKGROUND

Generally, a secure element, such as a smart card, includes hardware resources such as a secure processing unit (SCPU), a volatile memory and a non-volatile memory. The non-volatile memory stores one or more codes (applications) and data, and, when required to be executed or processed, a code and/or data may be loaded in the volatile memory. The secure element may be embedded in a SoC (System on the Chip) having several processing units, several memories and several functionalities. The SoC may be integrated in a larger module.

In a constraint environment like an IoT system (that is, the Internet of Things system), the secure element may have only a small non-volatile memory, such as an OTP (one time programmable) memory, that is used to store a limited amount of information, for example counters and/or keys. The secure element is not used to store codes and data. To keep the cost of the secure element low, the codes and data are stored in an external non-volatile memory, that is outside the secure element, for example in the SoC or in the module outside the SoC. A code and/or data are loaded into the volatile memory of the secure element, when required to be executed or processed.

In such a constraint context, it is important to secure the digital information (codes and/or data) when it is stored in the external memory, when it is loaded from the external memory into the internal memory of the secure element and when it is processed or executed by the secure element. In particular, the digital information has to be protected from physical attacks.

Such physical attacks concern discrete elements like smart cards, and SoCs. They can be performed in remote. To date, there are two main kinds of known physical attacks.

A first kind of physical attack is named "side-channel attack". A side-channel attack is any attack based on information gained from the implementation of a computer system, for example a secure element. Timing information, power consumption, electromagnetic leaks, sound can provide an extra source of information, which can be exploited. During an operation of the secure element, for example the execution of a cryptographic algorithm by the CPU or a transfer of data from one memory to another memory, an attacker may listen the electromagnetic emanations or power consumption in order to capture the physical behavior of the secure element. Such a listening enables to obtain secret information, like a key. For example, when a processing unit executes a cryptographic algorithm using secret information, it has a specific power consumption that can be captured by an oscilloscope in order to get the secret information.

A second kind of physical attacks is called "fault attacks". Fault attacks are a family of techniques that involve deliberately producing errors in a cryptosystem or in any sensitive system. These attacks can relate to hardware, like a crypto-processor, or software components. They are intended to cause an unusual behavior of cryptographic or sensitive operations in order to extract secret information such as an encryption key. During an operation executed by the secure element, a fault can be injected for example by changing a power supply, changing a clock or injecting laser pulses. The injected fault may result in altering the behavior of some electronic hardware of the secure element. For example, during an encryption operation, the attacker may inject a fault, which blocks the encryption. That means that the output will be in clear and not encrypted. It is a straightforward attack. A fault could also be injected during a PIN verification and the PIN could be considered as valid even if it is the wrong value. In another example, during a command that outputs data, a fault could alter the pointer of the output buffer and enable to dump an internal value that should remain secret.

A fault attack and a physical attack can also be combined.

There is a need to improve the situation. More precisely, there is a need to secure the digital information at any time, when it is stored in the external non-volatile memory, when it is loaded from the external memory to the secure element and when it is processed by the secure element.

SUMMARY

The present disclosure concerns a method for securely processing digital information, including the following steps, performed by a secure element including a secure processor, and at least one internal memory and a code associating unit, both external to the secure processor:
   loading the digital information from an external memory into the at least one internal memory of the secure element;
   at the code associating unit, segmenting the digital information into words of digital information, generating codes, that are either error-detection codes or error-correction codes, from said words of digital information and associating said codes with the corresponding words in the at least one internal memory;
   transferring the words of digital information and the associated codes from the at least one internal memory to the secure processor;
   in the secure processor, verifying the words of digital information based on the associated error-detection codes or error-correction codes before processing the digital information contained in said words.

The addition of error-detection codes (EDC) or error-correction codes (ECC) to the small words of digital information allows to ensure that the digital information has not been modified by an attack inside the secure element before transferring the words to the secure processor. Indeed, the EDC or ECC associated with a given word enables to detect one or more errors in this word.

In case that error-correction codes are generated, the ECC associated with a given word could be used not only to detect an error in the word but also to correct one or more bits in the word.

Advantageously, the method further includes a step of verifying the integrity of the digital information that is performed after the step of associating the error-detection codes or error-correction codes with the corresponding words and before transferring the words of digital information and the associated error-detection codes or error-correction codes to the secure processor.

The verification of the integrity is carried out after segmenting the digital information into words and can use the words of digital information themselves. This ensures that the words transferred to the secure processor with the associated error-detection codes or error-correction codes are not corrupted.

Advantageously, the method further includes a step of decrypting the digital information loaded from the external memory to obtain the digital information in clear, and wherein the step of segmenting into words is performed on the digital information in clear.

The encryption allows to protect the digital information when it is stored in the external memory and when it is transferred from the external memory into the secure element.

Advantageously, the method further includes a step of verifying the integrity of the digital information in encrypted form. This ensures that the attacker has not changed the encryption.

Thus, in some embodiments, the protection of the digital information is based on the well-known "Encrypt-then-MAC" (EtM) approach, and can be of the type "MAC-then-Encrypt-then-MAC". The EtM approach is considered as the most robust approach for authenticated encryption but it only protects data up to a certain level. In the present disclosure, the digital information in clear can also be authenticated. In that case, the digital information is protected by calculating a first MAC on the clear values with a key $K_0$, then by encrypting the digital information authenticated with the first MAC with a key $K_1$, then by calculating a second MAC with a key $K_2$ on the digital information authenticated and encrypted. In this way, the digital information is authenticated by a first MAC on the clear form and by a second MAC on the encrypted form. This ensures that the digital information has not been altered or corrupted during storage and during transfer from the external memory to the secure element.

Advantageously, the words of digital information are stored in an internal memory of the secure element in association with the error-detection codes or error-correction codes and, in said step of verifying the integrity of the digital information performed after the step of associating the words of digital information with the error-detection codes or error-correction codes, said words of digital information are read from the internal memory to perform the verification of integrity.

This allows to verify the integrity of the words of digital information that are stored in the internal memory of the secure element to be transferred to the secure processor. This ensures that the words ready to be transferred to the secure processor have not been altered. It provides an end-to-end security from storage in the external memory to processing by the secure processor in the secure element.

Advantageously, the words of digital information and the associated error-detection or error-correction codes are transferred to the secure processor only if the integrity of the digital information is successfully verified after the step of associating the error-detection or error-correction codes with the corresponding words.

The digital information can be segmented into words of a predetermined size that depends on a working format of the secure processor or on a capacity of registers of the secure processor.

The size of the words to which the error-detection or error-correction codes are added is adapted to the architecture of the secure processor. Typically, it corresponds to the format used by the secure processor (i.e., the size of digital blocks handled by the secure processor). The size of the words may correspond to the size of the registers of the secure processor. For example, the secure processor can be an 8-bit or 16-bit or 32-bit or 64-bit processor (the indicated bit values corresponding to the size of its registers). In that case, the size of the words can be set to the size of the processor registers (i.e. 8 bits or 16 bits or 32 bits or 64 bits respectively). However, for some calculations, the working format of the secure processor (i.e., the size or format of the digital blocks manipulated or processed by the secure processor during execution of a calculation) may be smaller than the size of the processor registers. For example, the working format of the secure processor could be 8 bits while the registers of the secure processor are 32 bits. The size of the words is adapted.

In some embodiments, the digital information being stored in segments in the external memory, the step of loading the digital information and the step of segmenting the digital information into words are performed iteratively for each of the segments.

In a particular embodiment,
in the step of loading each segment from the external memory, the secure element loads digital information in encrypted form and an integrity element,
in the step of verifying the integrity of the digital information in encrypted form, the secure element calculates an integrity element by chaining calculations on L+1 blocks of a predetermined number of bytes in encrypted form, and compares the calculated integrity element with the integrity element loaded.

Advantageously,
in the step of decrypting, N+1 blocks in encrypted form are decrypted into N blocks of digital information in clear and another integrity element;
in the step of segmenting, each of the N blocks of digital information in clear is divided into words of digital information.

Advantageously, in the step of verifying the integrity of the digital information performed after the step of associating the error-detection codes or error-correction codes with the corresponding words, the secure element calculates an integrity element by chaining calculations on L blocks of digital information in clear, and compares said calculated integrity element with said other integrity element resulting from the step of decrypting.

The method can further include the following steps, performed by a digital information provider:
segmenting the digital information in clear into segments; and, for each segment of digital information:
calculating a first integrity element for the digital information in clear;
encrypting the digital information and the first integrity element;
calculating a second integrity element of the result of the encryption and concatenating the result of the encryption and said second integrity element;
storing the result of the encryption concatenated with said second integrity in the external memory.

In addition, when a segment of digital information has been modified by the secure element, said secure element can update said segment of digital information in the external memory by executing the steps of:
calculating a first integrity element for the digital information in clear;
encrypting the digital information and the first integrity element;
calculating a second integrity element of the result of the encryption and concatenating the result of the encryption and said second integrity element;

updating the segment currently stored in the external memory with the result of the encryption concatenated with the second integrity element.

Optionally, each word of each block can have its own error detection code or error correction code stored in the secure element, that could be verified after calculating the first integrity element and before encrypting the N blocks of digital information. Thanks to that, the encryption path is more resistant to the fault attack.

Advantageously, the words of digital information are processed by the secure processor only if no error is detected in said words of digital information.

When the step of verifying a word of digital information by the secure processor based on the associated error-detection or error-correction code fails, said word of the digital information can be handled as not relevant by the secure processor or the method for securely processing the digital information can be aborted by the secure element.

A second aspect of the present disclosure concerns a secure element for securely processing digital information, including:
- a secure processor;
- at least one internal memory;
- a communication interface for loading the digital information from an external memory into the at least one internal memory of the secure element;
- a code associating unit for segmenting the digital information into words of digital information, generating error-detection codes or error-correction codes from said words of digital information and associating the generated codes with the corresponding words in the at least one internal memory; wherein the secure processor is configured to load the words of digital information and the associated error-detection codes or error-correction codes from the at least one internal memory and verify said words of digital information based on the associated error-detection codes or error-correction codes before processing the digital information contained in said words.

Advantageously, the secure element further includes an integrity verification unit that is configured to verify the integrity of the digital information based on the words of digital information that are read from the at least one internal memory.

The secure element can further include an integrity verification unit for verifying the integrity of the digital information in encrypted form and a decryption unit for decrypting the digital information that has been loaded to obtain the digital information in clear.

A third aspect of the present disclosure concerns a system on the chip including the secure element previously defined.

The system on the chip can have an external memory located outside the secure element.

A fourth embodiment of the present disclosure concerns a module including the system on the chip.

Advantageously, in the module, said external memory that is located outside the secure element is located either inside the system on the chip or outside the system on the chip.

A fifth aspect of the present disclosure concerns a non-transitory computer readable medium including program instructions for causing a secure element for securely processing digital information, said secure element including a secure processor, to perform the steps of the method previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
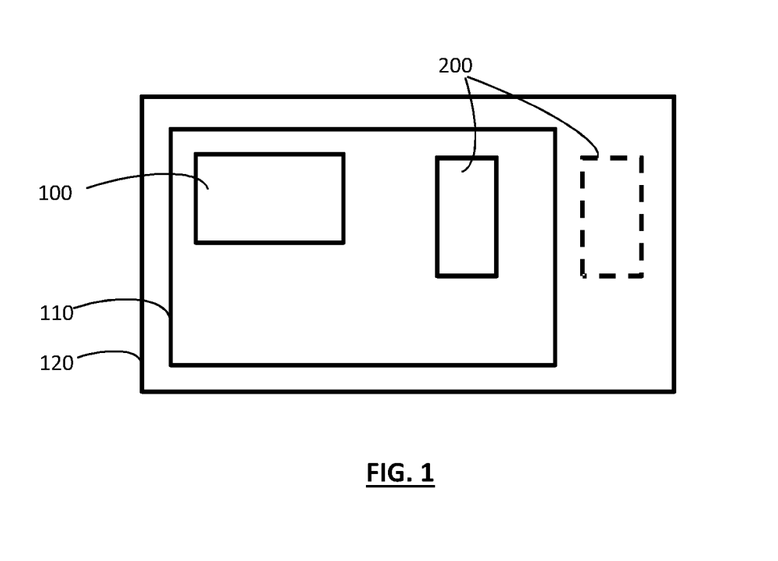
FIG. 1 shows a module embedding a SoC (System on the Chip) that has a secure element, according to an exemplary embodiment.

FIG. 1 shows a system including a secure element 100 and an external memory 200 (i.e., external to the secure element). The secure element is for example a smart card or a chip. It can be embedded in a SoC (System on Chip) 110 having several processing units, several memories and several functionalities (not represented). The SoC 110 may be integrated in a larger module 120. For example, this larger module 120 could be an IoT device (typically provided with a unique identifier and the ability to transfer data over a network), a telecommunication apparatus, a location system, a vehicle like a car or a plane, etc.

The secure element 100 has a secure processing unit 102, for example an integrated hardware intellectual property core (IP core).

Different exemplary and illustrative use cases (not limitative) of the secure element 100 are given below.

In a first exemplary use case, the secure element 100 can be integrated in a modem of a telecommunication system or apparatus. In such a case, it can handle network authentication and download secure applications.

In a second exemplary use case, the secure element 100 can be integrated in a tachograph and securely handle location data.

In a third exemplary use case, the secure element 100 can be integrated in a vehicle, for example a car or a plane, secure and manage safety data transport.

The external memory 200 stores digital information. The terms "digital information" designate data liable to be loaded into the secure element 100, such as executable code or information generated by executable code or used by executable code, or any other data to be used or processed by the secure element 100.

The secure element 100 is intended to load and process (or use) digital information stored in the external memory 200.

In an exemplary embodiment, memory segmentation is used in the external memory 200. The digital information is segmented and stored in segments.

A segment is made up of several blocks of a predetermined number of bytes. For example, a block could be 16-byte long (16B or 128 bits). A segment of digital information can for example include 64 blocks of 16 bytes, which corresponds approximately to a segment of 1 kilo-byte long (1 KB). Each segment has a set of attributes associated with it (such as the type of data contained in the segment, the length of the segment, the address of the segment, the version of the data, etc.). These attributes are recorded in a header attached to the segment. There are two main different types of segments, namely code segments including executable code and data segments including digital information which can be used by the code segments or an application or generated by an application.

The digital information is prepared to be stored in the external memory 200. The method of preparing the digital information to be stored in the external memory 200 is initially carried out by a digital information provider (i.e. a system for providing digital information).

Figure 5:
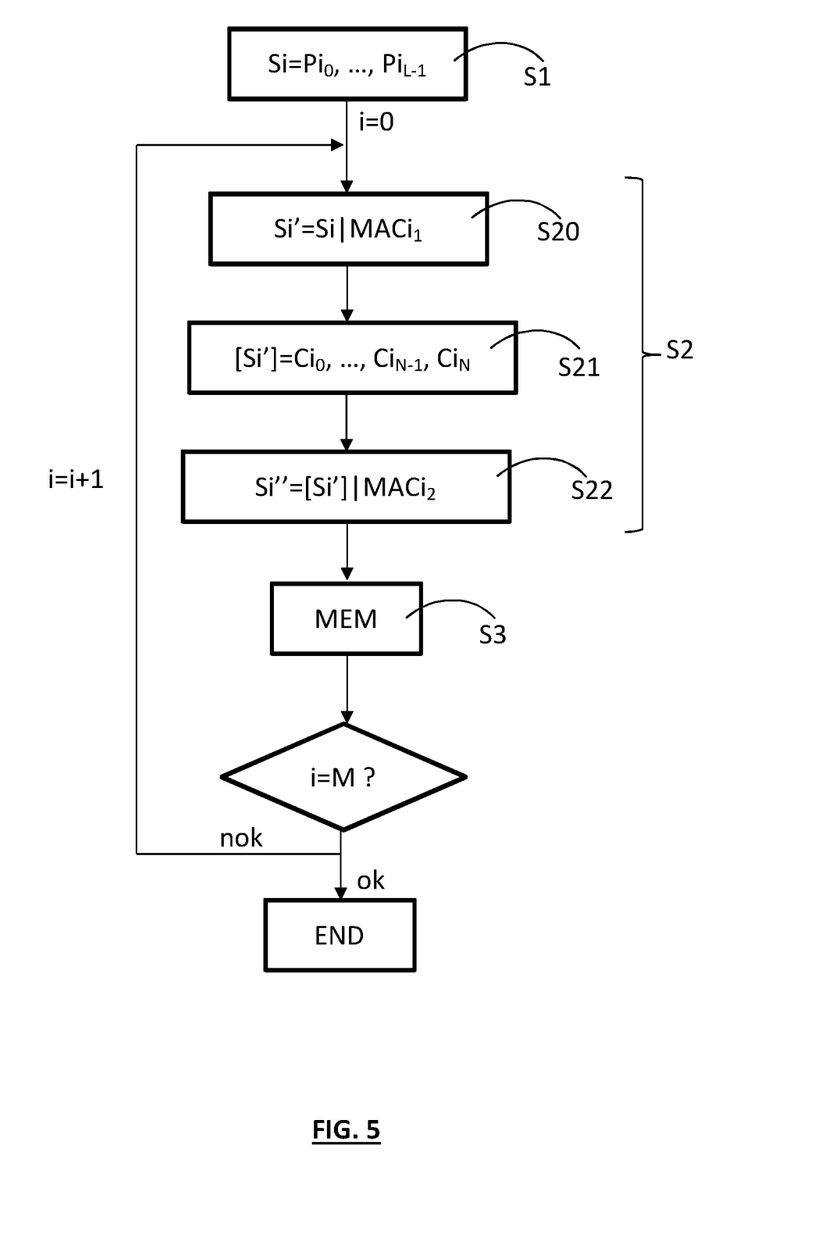
FIG. 5 represents a flowchart of a method of preparing digital information to be stored in an external memory, according to an exemplary embodiment.

An exemplary embodiment of the method of preparing the digital information to be stored in the external memory 200 will be described in reference to FIGS. 2 and 5.

In a first step S1, the digital information in clear is divided into M segments of digital information, referenced as 'Si' with $1 \leq i \leq M$.

Each segment Si of digital information in clear can be made up of a plurality of blocks of a predetermined number of bytes. For example, the blocks are each 16-byte long (128 bits). The size of the blocks may vary depending on the operation that has to be carried out on the segment. For example, the size of the blocks used for applying a MAC function (or for any other authentication function or algorithm) may be different from the size of the blocks used for encryption or decryption.

Then, in order to assure the confidentiality and authenticity of the digital information, each of the segments of digital information is subjected to an authenticated encryption in a step S2. In the present embodiment, the authenticated encryption is based on the well-known authenticated encryption "Encrypt-then-MAC" (EtM), and follows an approach of the type "MAC-then-Encrypt-then-MAC". More precisely, for each segment Si of digital information in clear, a first integrity element is produced based the digital information in clear in a step S20, then the digital information in clear combined to its first integrity element are encrypted in a step S21, and then a second integrity element is produced based on the result of the encryption in a step S22.

Each of the first and second integrity elements is a short piece of information used to authenticate the digital information, such as a MAC (Message Authentication Code). In the present disclosure, the first integrity element and the second integrity element related to a segment Si are referenced as '$MACi_1$' and '$MACi_2$', with $1 \leq i \leq M$.

Figure 2:
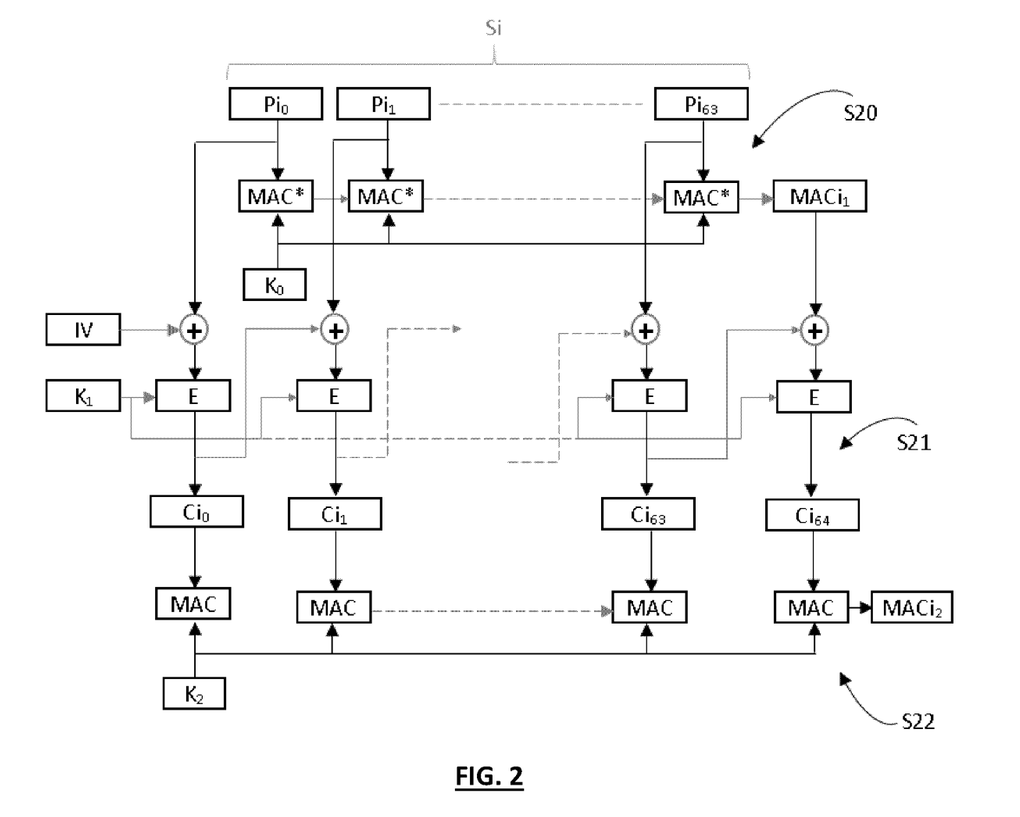
FIG. 2 illustrates operations of preparing digital information to be stored in an external memory (that is, external to a secure element) and liable to be loaded in the secure element, according to an exemplary embodiment.

In the step S20 of producing $MACi_1$ on the clear segment Si, the first MAC is calculated by chaining MAC calculations on the L blocks $Pi_0, \ldots, Pi_{L-1}$ of digital information in clear using a MAC function (referenced as MAC* in FIG. 2). The blocks of digital information in clear are referenced as $Pi_0, \ldots, Pi_{Li-1}$, wherein the letter 'P' refers to the word "Plaintext" and 'i' is the index of the segment. In the present exemplary embodiment, each block $Pi_0, \ldots, Pi_{L-1}$ is 128-bit long and each segment Si has L blocks (or possibly less than L blocks for an incomplete segment) of digital information in clear, where L is for example equal to 64 (this value being only an illustrative example).

The MAC function uses a first secret key $K_0$, for example a key of 256 bits. The resulting $MACi_1$ is for example 16-byte long (128 bits). The integrity element $MACi_1$ is concatenated (combined) with the segment Si of digital information in clear, so as to form a new authenticated segment Si'=Si|$MACi_1$ ('|' representing the concatenation).

The segment Si' includes the segment of digital information in clear Si concatenated with the integrity element $MACi_1$.

In the step S21 of encryption, the authenticated segment Si' resulting from the step S20 is encrypted by the execution of an encryption algorithm. The encryption algorithm is applied on N+1 blocks forming the segment Si' and produces N+1 encrypted blocks referenced as $Ci_0, Ci_N$ (the letter 'C' referring to 'Ciphertext'), forming an authenticated and encrypted segment referenced as [Si'] (the brackets representing the encryption).

The number of blocks N related to the encryption can be identical or different to the number L related to the authentication, depending on the type of authentication function and the type of the encryption algorithm used.

Figure 3:
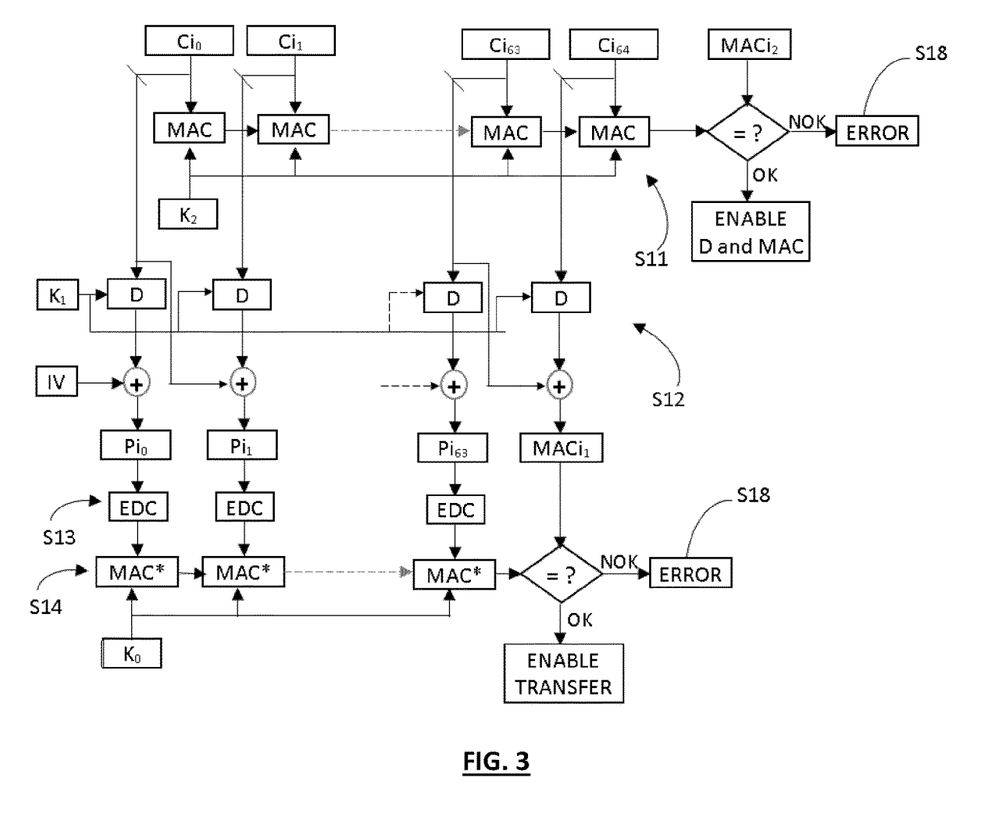
FIG. 3 illustrates operations of processing the digital information by the secure element, after loading from the external memory into the secure element, according to an exemplary embodiment.

In the present exemplary embodiment, illustrated in FIGS. 2 and 3, N and L are identical and equal to 64. The encrypted blocks $Ci_0, Ci_N$ are each here 16-byte long (128 bits).

The encryption uses a second secret key $K_1$, for example a key of 256 bits. In the present embodiment, the second key $K_1$ is different from the first key $K_0$ (but $K_0$ and $K_1$ could be the same key).

In the step S22 of producing $MACi_2$, the second MAC is calculated by chaining MAC calculations on L+1 encrypted blocks $Ci_0, Ci_L$ using a MAC function (referenced as 'MAC' in FIG. 2). This MAC function uses a third key $K_2$, that is for example a key of 256 bits. In the present embodiment, the third key $K_2$ is different from the first key $K_0$ and from the second key $K_1$ (but $K_2$ could be identical to $K_0$ and/or $K_1$, but this is less secure). The resulting integrity element $MACi_2$ is for example 16-byte long (128 bits). $MACi_2$ is concatenated (combined) to the authenticated and encrypted segment [Si'], so as to form a new authenticated segment Si' to be stored (authenticated and encrypted segment referenced as Si'=[Si']|$MACi_2$).

Optionally, the integrity element $MACi_2$ may be protected by encryption.

Optionally, only a part of the bits of the integrity element $MACi_2$ may be appended to the authenticated and encrypted segment [Si'], for example only some bits 'LSB' (Least Significant Bits).

Then, in a step S3, the segment of digital information Si' with $1 \leq i \leq M$, in protected form (here authenticated, then encrypted and then authenticated), is stored in the external memory 200.

The steps S2 and S3 are repeated for each segment Si of digital information with $1 \leq i \leq M$.

Once stored in the external memory 200, the digital information can be loaded and processed (or used) by the secure element 100.

Figure 4:
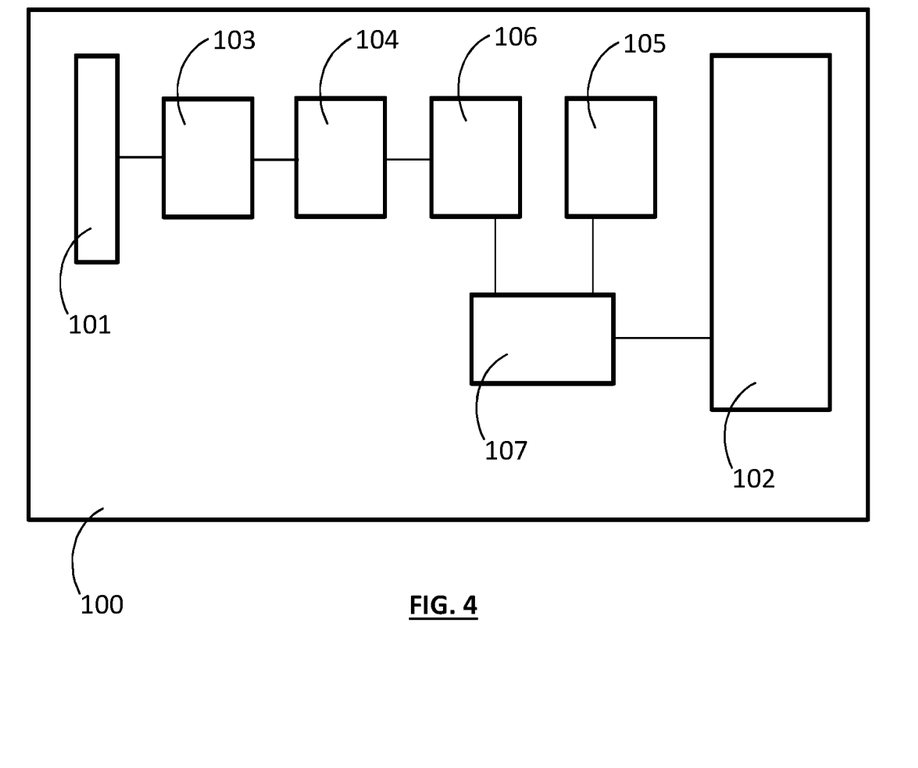
FIG. 4 represents the secure element, according to an exemplary embodiment.

In reference to FIG. 4, the secure element 100 has a communication interface 101, a processing unit (CPU) 102, a first integrity verification unit 103, a decryption unit 104, a second integrity verification unit 105, a code associating unit 106 and at least one internal memory 107.

The processing unit (CPU) 102 is for example a secure processor (i.e. a processor with security features having a high assurance level certification for security-critical applications), for example a processor of the type RISCV or ARMSC300.

The at least one internal memory 107 is for example a volatile memory. It can be connected by buses to the processing unit 102. It could have a local scrambling and an encryption to protect it.

Figure 6:
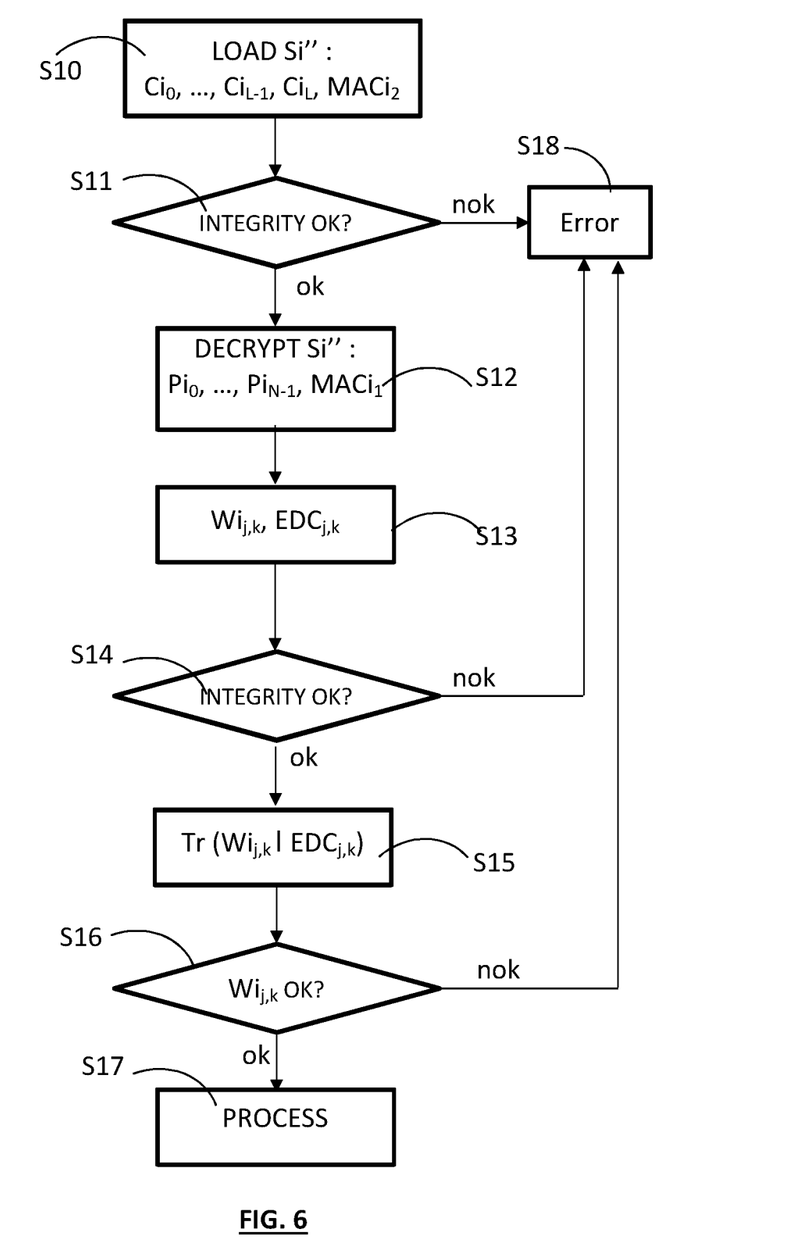
FIG. 6 represents a flowchart of a method of securely processing the digital information stored in the external memory, performed by a secure element, according to an exemplary embodiment.

In order to use the digital information stored in the external memory 200, the secure element 100 performs a method for securely processing digital information, that will now be described in reference to FIGS. 3 and 6 according to a first exemplary embodiment.

In a first step S10, the secure element 100 loads a segment of digital information, in protected form, previously referenced as Si', from the external memory 200 into an internal memory 107 of the secure element 100, through the communication interface 101. The segment Si' includes the authenticated and encrypted segment [Si'] concatenated with the second integrity element MACi$_2$, namely =[Si']|MACi$_2$.

In a second step S11, the secure element 100 verifies the integrity of the loaded segment Si' of digital information in encrypted form. To this end, the first MAC unit 103 calculates a MAC from the loaded segment Si', by chaining calculations on L first blocks Ci$_0$, Ci$_L$ in encrypted form of the segment Si'. The first integrity verification unit 103 uses a MAC function and the key K$_2$. Then, it compares the calculated MAC with the integrity element MACi$_2$ included in the loaded segment Si'. If the calculated MAC matches the loaded MACi$_2$, the integrity of [Si'] is successfully checked. In that case, the decryption and an integrity verification after decryption are enabled (step S19 in FIG. 3). If the calculated MAC does not match the loaded MACi$_2$, the integrity of the [Si'] is denied. In that case, the processing of the digital information is followed by an error step S18 that results in aborting the processing of the digital information. Alternatively, the error step S18 may result in handling segment Si' as not relevant and discarding it (i.e., not processing or not using it).

In a third step S12, after the integrity of [Si'] has been successfully verified, the secure element 100 decrypts N+1 blocks Ci$_0$, . . . , Ci$_N$. The decryption is executed by the decryption unit 104 and uses the key K$_1$. A result of the decryption step S12 is digital information in clear and the integrity element MACi$_1$. More precisely, the decryption unit 104 outputs N blocks of digital information in clear Pi$_0$, . . . , Pi$_{N-1}$ and the integrity element MACi$_1$.

As previously indicated, the number L used for verifying the integrity could be equal to N used for decryption or be different from N, depending on the function to verify the integrity and the decryption algorithm.

In a fourth step S13, the code associating unit 106 first segments the digital information in clear (i.e., the digital information that results from the decryption step S12) into words of digital information. For example, the code associating unit 106 takes the N blocks of digital information Pi$_0$, . . . , Pi$_{N-1}$ as input and segments each block into words of a smaller size. Each block Pi$_j$, with 0≤j≤N−1, is divided into X words Wi$_{j,k}$, with 1≤k≤X By definition, a 'word' has a predetermined number of bytes. The size of the words may depend on a working format of the secure processor 102 or on a capacity of registers of the secure processor 102. The working format may be less than the capacity of the registers. In some embodiments, the size of the words Wi$_{j,k}$ is equal to the working format of the secure processor or is equal to the size of the processor registers. The size of the words can be less than or equal to the number of bytes of a block. In a first illustrative example, the secure processor 102 has registers of 32 bits and the code associating unit 106 segments each block of 16-byte long (128 bits) into four words of 32 bits. In a second illustrative example, the secure processor 102 has a working format of 8 bits and the code associating unit 106 segments each block of 16-byte long into 16 words of 8-bit long. In a particular embodiment, the size of the words is equal to the minimal value among the size of the registers and the working format of the processing unit 102. Alternatively, the size of the words may be less than the working format of the secure processor or less than the size of the processor registers.

Then, in the first embodiment, in the step S13, the code associating unit 106 generates an error-detection code (EDC), referenced as EDC$_{j,k}$, for each of the words Wi$_{j,k}$ and add (or combine) said error-detection code EDC$_{j,k}$ to the corresponding word Wi$_{j,k}$. In other words, the code EDC$_{j,k}$ is generated from the word Wi$_{j,k}$ and then appended to said word Wi$_{j,k}$.

The calculation of the error-detection codes is based on a mathematical function. For example, the error-detection code is a parity code or a Hamming code. Advantageously, it might not be a cryptographic function, which would result in less computing resources. The error-detection code EDC$_{j,k}$ allows to detect an error present in data (i.e., in a word Wi$_{j,k}$) received when said data has been transferred. The code EDC$_{j,k}$ contains some bits, which are appended to the original data (i.e., the word Wi$_{j,k}$). The code EDC$_{j,k}$ allows to detect an error, if it is occurred during transmission of the original data Wi$_{j,k}$.

The words Wi$_{j,k}$ of digital information in clear (with 0≤j≤N−1 and 1≤k≤X) associated with their respective error-detection codes EDC$_{j,k}$ are stored in the internal memory 107 of the secure element 100.

After the step S13 of associating the error-detection codes EDC$_{j,k}$ to the words of digital information Wi$_{j,k}$ (with 0≤j≤N−1 and 1≤k≤X) and storing the words with their associated error-detection codes in the internal memory 107, the secure element 100 verifies the integrity of the digital information in clear, in a step S14. The integrity of the digital information in clear is verified on the words of digital information Wi$_{j,k}$ read from the internal memory 107 (without the associated error-detection codes EDC$_{j,k}$). More precisely, the second integrity verification unit 105 reads the words Wi$_{j,k}$ from the internal memory 107, reconstructs the segment Si of digital information in clear and calculates an integrity element (here a MAC) by chaining calculations on L blocks Pi$_0$, . . . , Pi$_{L-1}$ of digital information in clear using a MAC function and the key K$_0$. Then, the second integrity verification unit 105 compares the MAC calculated to the integrity element MACi$_1$ resulting from the decryption step S12.

If the calculated MAC matches MACi$_1$, the integrity of the digital information in clear is successfully verified. In that case, the transfer of the words Wi$_{j,k}$ from the internal memory 107 to the secure processor 106 is enabled (step S18 in FIG. 3) and the method proceeds with the next steps S15-S17 shown in FIG. 6. If the calculated MAC does not match MACi$_1$, the integrity of the digital information in clear is denied and the processing of digital information is followed by an error step S2. This error step S18 can result in aborting the processing of the digital information. Alternatively, the error step S18 may result in handling segment Si as not relevant and discarding it (i.e., not processing or not using it and erasing it).

The next steps S15 to S17 are performed successively for each of the words Wi$_{j,k}$ (with 0≤j≤N−1 and 1≤k≤X) stored in the internal memory 107.

In the step S15, each word of digital information Wi$_{j,k}$ (with 0≤j≤N−1 and 1≤k≤X) and its associated error-detection code are transferred to the secure processor 102. The word of digital information Wi$_{j,k}$ and its associated error-detection code are transferred to the secure processor 102 only when the integrity of the digital information in clear is successfully verified at step S14.

Then, in the step S16, the secure processor 102 verifies the received word WOi$_{j,k}$ by using the associated error-detection code. If no error is detected in the word in the step S16, this word of digital information Wi$_{j,k}$ is processed (or used) by the secure processor 102, in step S17. If an error is detected in step S16, the method goes to the error step S18. This error step S18 can result either in aborting the processing of the digital information, or in considering as not relevant and discarding the erroneous word.

The steps S10 to S17 or S18 are executed iteratively for the plurality of segments Si" of digital information, in a protected form, loaded from the external memory 200.

During the processing or use of the digital information by the secure element, a segment Si may be modified. The modified segment is referred as Si$_c$. In such a case, the secure element 100 can perform the following steps in order to update the segment that has been modified, referenced as Si$_c$", in the external memory 200:

- calculating a first integrity element MACi$_{c\_1}$ for the modified digital information Si$_c$ in clear;
- encrypting the digital information Si$_c$ concatenated with the first integrity element MACi$_{c\_1}$ to compute [Si$_c$']= [Si$_c$]|[MACi$_{c\_1}$];
- calculating a second integrity element MACi$_{c\_2}$ of the result of the encryption [Si$_c$']=[Si$_c$]|[MACi$_{c\_1}$] and concatenating the result of the encryption and said second integrity element, to form Si$_c$"=[Si$_c$]|[MACi$_{c\_1}$] |MACi$_{c\_2}$;
- updating the segment currently stored in the external memory (200) with the result Si$_c$" of the encryption concatenated with the second integrity element.

Optionally, each word Wi$_{j,k}$ of each block of index j (Pi$_0$, . . . , Pi$_{N-1}$) can have its own error detection code stored in the internal memory 107 of the secure element 100. The error detection code of each word could be verified after the computation of the first integrity element MACi$_{c\_1}$ and before executing the encryption step. Thanks to that, the encryption path is more resistant to the fault attack.

Then, the updated segment is downloaded from the secure element 100 into the external memory 200 and the currently stored segment is replaced by the updated segment.

The processing of the digital information, as described in steps S10 to S17 or S18, is performed by the secure element under control of program instructions. The program instructions are stored in one or more storage modules, such as volatile memory, e.g., RAM, etc., and/or non-volatile memory, e.g., ROM, Flash, NAND, etc., that is permanently or removably integrated in the secure element. Therefore, the present disclosure also concerns a non-transitory computer readable medium including program instructions for causing a secure element for securely processing digital information, said secure element including a secure processor, to perform the steps previously described, in particular the steps of:

- loading the digital information from an external memory into the secure element;
- segmenting the digital information into words of digital information, generating error-detection codes from said words of digital information and associating said error-detection codes with the corresponding words;
- transferring the words of digital information and the associated error-detection codes to the secure processor;
- in the secure processor, verifying the words of digital information based on the associated error-detection codes before processing the digital information contained in said words.

A second exemplary embodiment of the method of processing the digital information, carried out by the secure element 100, is based on the first exemplary embodiment and differs from it in that the codes generated in the step S13 by the code associating unit 106 is an error-correction code (ECC), referenced as ECC$_{j,k}$, for each of the words Wi$_{j,k}$. This code ECC$_{j,k}$ is then combined with the corresponding word Wi$_{j,k}$. The error-correction code ECC$_{j,k}$ allows to detect and also correct one or more bit errors in the corresponding word Wij,k, if it is occurred during transmission of the original data Wi$_{j,k}$. In the second exemplary embodiment, in case of detection of an error in a word Wij,k, a correction of one or more bits of this word Wij,k could be carried out by the secure element 100, for example by a correction unit, before transferring the word Wi$_{j,k}$ to the secure processor 102.

In the present disclosure, the digital information stored in the external memory 200 and intended to be processed (used) by the secure processor 102 in the secure element 100 is protected by an authenticated encryption that follows an approach of the type "MAC-then-Encrypt-then-MAC". It means that a first MAC is calculated on the digital information in clear, then an encryption is applied on the digital information and the first MAC, and then a second MAC is calculated on the result of the encryption. The digital information thus protected is loaded from the external memory to the secure element. In the secure element, the integrity of the digital information in protected form is verified before decryption. After decryption, the digital information in clear is segmented (divided) into words having a size adapted to the secure processor and error-detection codes or error-correction codes are added to these words. The words of digital information in clear and the associated error-detection codes (EDC) or error-correction codes (ECC) are stored in an internal memory of the secure element, ready to be transferred to the secure processor. Before transferring the words and their associated codes (EDC or ECC) to the secure processor, the integrity of the digital information in clear is verified. This verification is made by computing a MAC (or integrity element) on the digital information in clear, obtained by reading the words stored in the internal memory, and comparing the computed MAC with a reference MAC computed in a secure environment.

Such a configuration provides an end-to-end security in the processing of the digital information from storage in the external memory to processing in the secure processor in the secure element. This ensures that the digital information has not been altered during storage in the external memory, during transfer from the external memory into the secure element, and in the secure element up to the point of transferring the digital information to the secure processor.

Different types of MAC function to generate elements of integrity for the digital information and to verify the integrity of the digital information could be used. For example, a CMAC function (Cipher-based Message Authentication Code), that is a block cipher-based message authentication code algorithm, or a HMAC algorithm (hash-based message authentication code), that is a specific type of message authentication code (MAC) involving a cryptographic hash function and a secret cryptographic key, could be used. In that case, the block size might not have the same number of bytes as the one used for the encryption. Instead of a MAC function, any other authentication function could be used.

The invention claimed is:

1. A method for securely processing, within a secure element, digital information, said secure element including a secure processor adapted for security-critical applications, and at least one internal memory and a code associating unit, both external to the secure processor, wherein the method provides an end-to-end security ensuring that the digital information has not been altered from storage in an external memory to processing by the secure processor, and comprises the steps, performed by the secure element:

loading the digital information from the external memory into the at least one internal memory of the secure element;

decrypting the digital information to obtain the digital information in clear and a first integrity element;

by the code associating unit, segmenting the digital information in clear into words of digital information, generating error-detection codes or error-correction codes from said words of digital information and associating said error-detection codes or error-correction codes with the corresponding words in the at least one internal memory;

verifying the integrity of the digital information in clear by calculating an integrity element based on the segmented words and comparing the calculated integrity element with the first integrity element obtained during decryption, ensuring that the digital information has not been altered before transferring;

transferring the words of digital information and the associated error-detection codes or error-correction codes from the at least one internal memory to the secure processor;

by the secure processor, verifying the words of digital information based on the associated error-detection codes or error-correction codes before processing the digital information contained in said words.

2. The method according to claim 1, further including a step of verifying the integrity of the digital information in encrypted form.

3. The method according to claim 1, wherein the words of digital information are stored in an internal memory of the secure element in association with the error-detection codes or error-correction codes and, in said step of verifying the integrity of the digital information performed after the step of associating the words of digital information with the error-detection codes or error-correction codes, said words of digital information are read from the internal memory to perform the verification of integrity.

4. The method according to claim 1, wherein the words of digital information and the associated error-detection codes or error-correction codes are transferred to the secure processor only if the integrity of the digital information is successfully verified after the step of associating the associating error-detection or error-correction codes with the corresponding words.

5. The method according to claim 1, wherein the digital information is segmented into words of a predetermined size that depends on a working format of the secure processor or on a capacity of registers of the secure processor.

6. The method according to claim 1, wherein, the digital information being stored in segments in the external memory, the step of loading the digital information and the step of segmenting the digital information into words are performed iteratively for each of the segments.

7. The method according to claim 1, wherein:

in the step of loading each segment from the external memory, the secure element loads digital information in encrypted form and an integrity element, in the step of verifying the integrity of the digital information in encrypted form, the secure element calculates an integrity element by chaining calculations on L+1 blocks of a predetermined number of bytes in encrypted form, and compares the calculated integrity element with the integrity element loaded.

8. The method according to claim 1, wherein in the step of decrypting, N+1 blocks in encrypted form are decrypted into N blocks of digital information in clear and another integrity element;

in the step of segmenting, each of the N blocks of digital information in clear is divided into words of digital information.

9. The method according to claim 1, wherein in the step of verifying the integrity of the digital information performed after the step of associating the error-detection codes or error-correction codes with the corresponding words, the secure element calculates an integrity element by chaining calculations on L blocks of digital information in clear, and compares said calculated integrity element with said other integrity element resulting from the step of decrypting.

10. The method according to claim 1, further including the following steps, performed by a digital information provider:

segmenting the digital information in clear into segments; and, for each segment of digital information:

calculating a first integrity element for the digital information in clear;

encrypting the digital information and the first integrity element;

calculating a second integrity element of the result of the encryption and concatenating the result of the encryption and said second integrity element;

storing the result of the encryption concatenated with said second integrity in the external memory.

11. The method according to claim 10, wherein, when a segment of digital information has been modified by the secure element, said secure element updates said segment of digital information in the external memory by executing the steps of:

calculating a first integrity element for the digital information in clear;

encrypting the digital information and the first integrity element;

calculating a second integrity element of the result of the encryption and concatenating the result of the encryption and said second integrity element;

updating the segment currently stored in the external memory with the result of the encryption concatenated with the second integrity element.

12. The method according to claim 1, wherein the words of digital information are processed by the secure processor only if no error is detected in said words of digital information.

13. The method according to claim 1, wherein, when the step of verifying a word of digital information by the secure processor based on the associated error-detection code or error-correction code fails, said word of the digital information is handled as not relevant or the method for securely processing the digital information is aborted.

14. A non-transitory computer readable medium including program instructions for causing a secure element for securely processing digital information, said secure element having a secure processor, to perform the steps of the method according to claim 1.

15. A secure element for securely processing digital information, including:
- a secure processor adapted for security-critical applications;
- at least one internal memory;
- a communication interface for loading the digital information from an external memory into the at least one internal memory of the secure element;
- a decryption unit for decrypting the digital information to obtain the digital information in clear and a first integrity element;
- a code associating unit for segmenting the digital information in clear into words of digital information, generating error-detection codes or error-correction codes from said words of digital information and associating said error-detection codes or error-correction codes with the corresponding words in the at least one internal memory;
- an integrity verification unit for verifying the integrity of the digital information in clear by calculating an integrity element based on the segmented words and comparing the calculated integrity element with the first integrity element obtained during decryption, ensuring that the digital information has not been altered before transferring the segmented words from the at least one internal memory to the secure processor;
- wherein the secure processor is configured to load the words of digital information and the associated error-detection codes or error-correction codes from the at least one internal memory and verify said words of digital information based on the associated error-detection codes or error-correction codes before processing the digital information contained in said words.

16. The secure element of claim 15, further including an integrity verification unit for verifying the integrity of the digital information in encrypted form and a decryption unit for decrypting the digital information that has been loaded to obtain the digital information in clear.

17. A system on the chip including the secure element according to claim 15.

18. The system on the chip according to claim 17, further including an external memory located outside the secure element.

19. A hardware module including the system on the chip according to claim 18.

20. The hardware module according to claim 19, wherein said external memory that is located outside the secure element is located either inside the system on the chip or outside the system on the chip.

* * * * *